(12) United States Patent
Milanesi et al.

(10) Patent No.: US 11,326,659 B2
(45) Date of Patent: May 10, 2022

(54) BRAKING DEVICE

(71) Applicant: FRENI BREMBO S.P.A., Curno (IT)

(72) Inventors: Andrea Milanesi, Curno (IT); Mario Tironi, Curno (IT); Roberto Noris, Curno (IT)

(73) Assignee: Freni Brembo S.p.A., Bergamo (IT)

(*) Notice: Subject to any disclaimer, the term of this patent is extended or adjusted under 35 U.S.C. 154(b) by 0 days.

(21) Appl. No.: 16/648,312

(22) PCT Filed: Sep. 14, 2018

(86) PCT No.: PCT/IB2018/057042
§ 371 (c)(1),
(2) Date: Mar. 18, 2020

(87) PCT Pub. No.: WO2019/058237
PCT Pub. Date: Mar. 28, 2019

(65) Prior Publication Data
US 2020/0217377 A1    Jul. 9, 2020

(30) Foreign Application Priority Data
Sep. 25, 2017   (IT) .................. 102017000107187

(51) Int. Cl.
*F16D 65/12*     (2006.01)
*F16D 65/02*     (2006.01)

(52) U.S. Cl.
CPC ......... *F16D 65/123* (2013.01); *F16D 65/125* (2013.01); *F16D 65/128* (2013.01);
(Continued)

(58) Field of Classification Search
USPC ................................................ 188/218 XL
See application file for complete search history.

(56) References Cited

U.S. PATENT DOCUMENTS 4,280,598 A  *  7/1981  Pollinger .............. F16D 65/123
                                                    188/218 XL
8,651,248 B2   2/2014  Mueller
(Continued)

FOREIGN PATENT DOCUMENTS

DE        19528434 A1    2/1997
DE     102008035750 A1   2/2010
(Continued)

OTHER PUBLICATIONS

European Patent Office, International Search Report with Written Opinion, dated Nov. 27, 2018, 14 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A braking device for a vehicle capable of resulting in an increased driving comfort is provided. The braking device may have a brake disc of a disc brake for rotating about a rotation axis, in which the disc may have a disc body. The disc body may have a braking band having opposite braking surfaces and at least one connection portion for connecting the disc to a connection device of a vehicle associable with the braking device. The braking band defines an axial direction parallel to the rotation axis of the brake disc, a radial direction orthogonal to the axial direction and a tangential or circumferential direction orthogonal both to the axial direction and to the radial direction. The connection portion is connected to the braking band by connecting elements, the connecting elements being a plurality of elements equally spaced apart in circumferential direction.

13 Claims, 10 Drawing Sheets

(52) U.S. Cl.
CPC .............. *F16D 2065/132* (2013.01); *F16D 2065/1328* (2013.01); *F16D 2065/1384* (2013.01); *F16D 2200/003* (2013.01); *F16D 2200/0013* (2013.01); *F16D 2200/0021* (2013.01)

(56) References Cited

U.S. PATENT DOCUMENTS

| | | | | |
|---|---|---|---|---|
| 8,967,339 | B2* | 3/2015 | Drewes | ............... F16D 65/123 188/218 XL |
| 9,651,104 | B2* | 5/2017 | Drewes | ............... F16D 65/123 |
| 2003/0159893 | A1* | 8/2003 | Tironi | ............... B22D 11/0405 188/71.1 |
| 2004/0084262 | A1* | 5/2004 | Baylis | ..................... F16D 3/06 188/218 XL |
| 2004/0173418 | A1* | 9/2004 | Saame | ............... F16D 65/123 188/17 |
| 2011/0162925 | A1* | 7/2011 | Mueller | ............... F16D 65/123 188/218 XL |
| 2011/0278115 | A1* | 11/2011 | Drewes | ............... F16D 65/123 188/218 XL |
| 2014/0158486 | A1* | 6/2014 | Schorn | ................. F16D 65/12 188/218 XL |

FOREIGN PATENT DOCUMENTS

| | | |
|---|---|---|
| DE | 102008042168 A1 | 3/2010 |
| DE | 102014114934 A1 | 4/2015 |
| EP | 1122456 B1 | 8/2001 |
| EP | 1227261 A2 | 7/2002 |
| JP | 2009250325 A | 10/2009 |

* cited by examiner

BRAKING DEVICE

FIELD OF THE INVENTION

The present invention relates to braking devices comprising brake discs suitable for vehicles.

In particular, the present invention relates to braking devices which suffer from the problem of having vibrations during the application of the braking action or have a particular noise such as squeaking.

BACKGROUND ART

The brake caliper in a disc brake is generally arranged straddling the outer peripheral edge of a brake disc, suitable for rotating about a rotation axis (A-A) defining an axial direction (X-X). Moreover, in a disc brake there is defined a radial direction (R-R) which is substantially orthogonal to said axial direction (X-X), and a tangential (C-C) or circumferential direction (C-C), which is orthogonal both to said axial direction (X-X) and to said radial direction (R-R).

Brake calipers are restrained to a support structure which remains stationary with respect to the vehicle wheel, such as for example an axle-journal of a suspension of a vehicle or a hub of a vehicle wheel or a fork or a fork of a motorcycle. The brake caliper usually comprises a caliper disc body having two elongated portions arranged facing opposite braking surfaces of a brake disc, and at least one bridge which connects said two elongated portions to each other. The conveniently actuated calipers press the pads against the braking band and the braking action is generated by the friction between the pads and the braking band of the brake disc. In the case of applications for motorcycles, a typical embodiment provides a plurality of studs provided on the wheel of the vehicle which are suitable for forming coupling surfaces for the brake disc, which comprises a plurality of reciprocal coupling seats which are usually spaced apart equally from one another in tangential or circumferential direction.

A solution of device of disc brake is known from document EP 1 122 456 B1 in the of the Applicant.

Albeit optimized to achieve other objectives, including an improved expansion of the braking band when heated by the braking action, this known solution is not optimized to eliminate or minimize the vibrations, in particular the high-frequency ones which generate audible squeaking especially in the step of slowing down the vehicle.

It is also known how the bothersome audible squeaking during the braking actions are in part due to the disc vibrations excited by the braking action. These vibrations tend to take on the shape of vibrations which "travel" about the disc, that is circumferentially, with a shorter wave length than the circumference of the disc. It is also known that the velocity and frequency of the waves tend to be such that as the disc rotates, they generate a series of nodes and recesses which are stationary with respect to the caliper and the pads. Therefore, by using the disc as reference point, the wave may be broken down into a series of peaks and recesses which travel about the disc.

Solution

The objective of the present invention is to provide a braking device in which the tendency to create these waves is reduced.

This and other objects and advantages are achieved with the braking device, the disc brake and the having the features described below.

Certain advantageous embodiments are the object of the dependent claims.

The present invention provides a brake disc having a series of areas, of portions, which alternatively show a relatively high and a relatively low rigidity arranged about the disc in which a prime number of each type of region is present and in particular, there are seven of each type of region.

The analysis of this solution shows how the solution proposed allows a braking comfort to be obtained, and therefore a reduction of the vibrations and in particular an absence of vibrations which lead to squeaking, which is much greater than the solutions of the prior art.

Moreover, the solution proposed has shown how the use of seven regions having increased rigidity obtained with seven connecting elements between braking band and bell is largely more comfortable than a solution with five connections or eleven connections, solutions always with a prime number of connections but the first excessively yielding and therefore noisy and at lower frequencies, and the second more rigid and therefore even noisier but at higher frequencies, respectively, at times accentuating even more the audible squeaking during braking to slow down the vehicle.

The solution proposed, in one of the embodiments thereof with hollow body pins open externally, also has shown an increased capacity of resisting the most severe braking actions and simultaneously facilitating the disposal of the heat generated during the braking action.

This advantageous effect is emphasized due to the provision of a bell comprising axially overhanging extensions and flow-diverting fins which direct the cooling air towards the ventilation duct of the braking band.

DRAWINGS

Further features and advantages of the device, of the disc brake and of the vehicle will be apparent from the description provided below of preferred embodiments thereof, given by way of non-limiting examples, with reference to the accompanying drawings, in which.

DESCRIPTION OF SOME PREFERRED EMBODIMENTS

Figure 1:
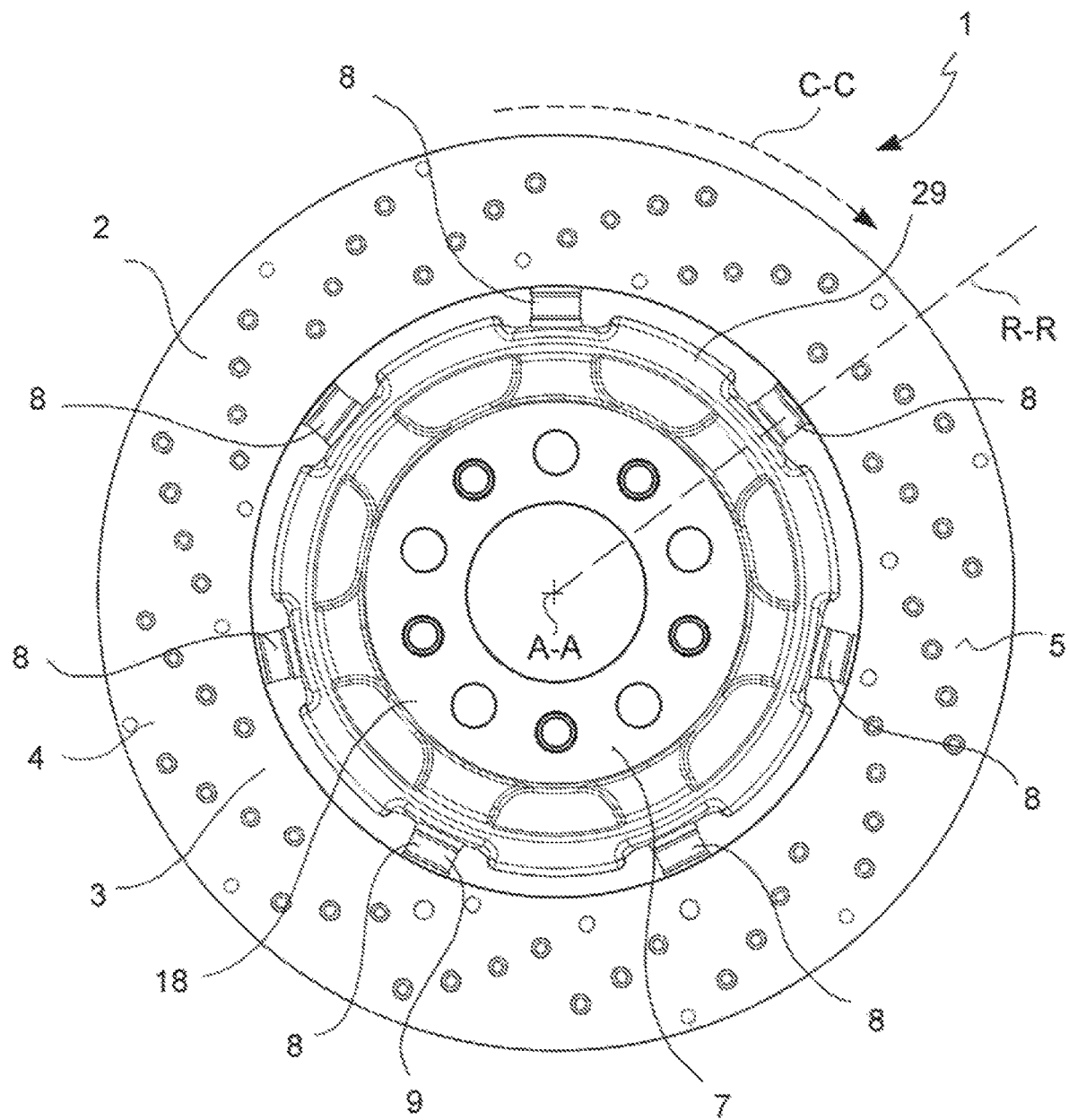
FIG. 1 depicts a front view of a braking device according to the invention.
Figure 2:
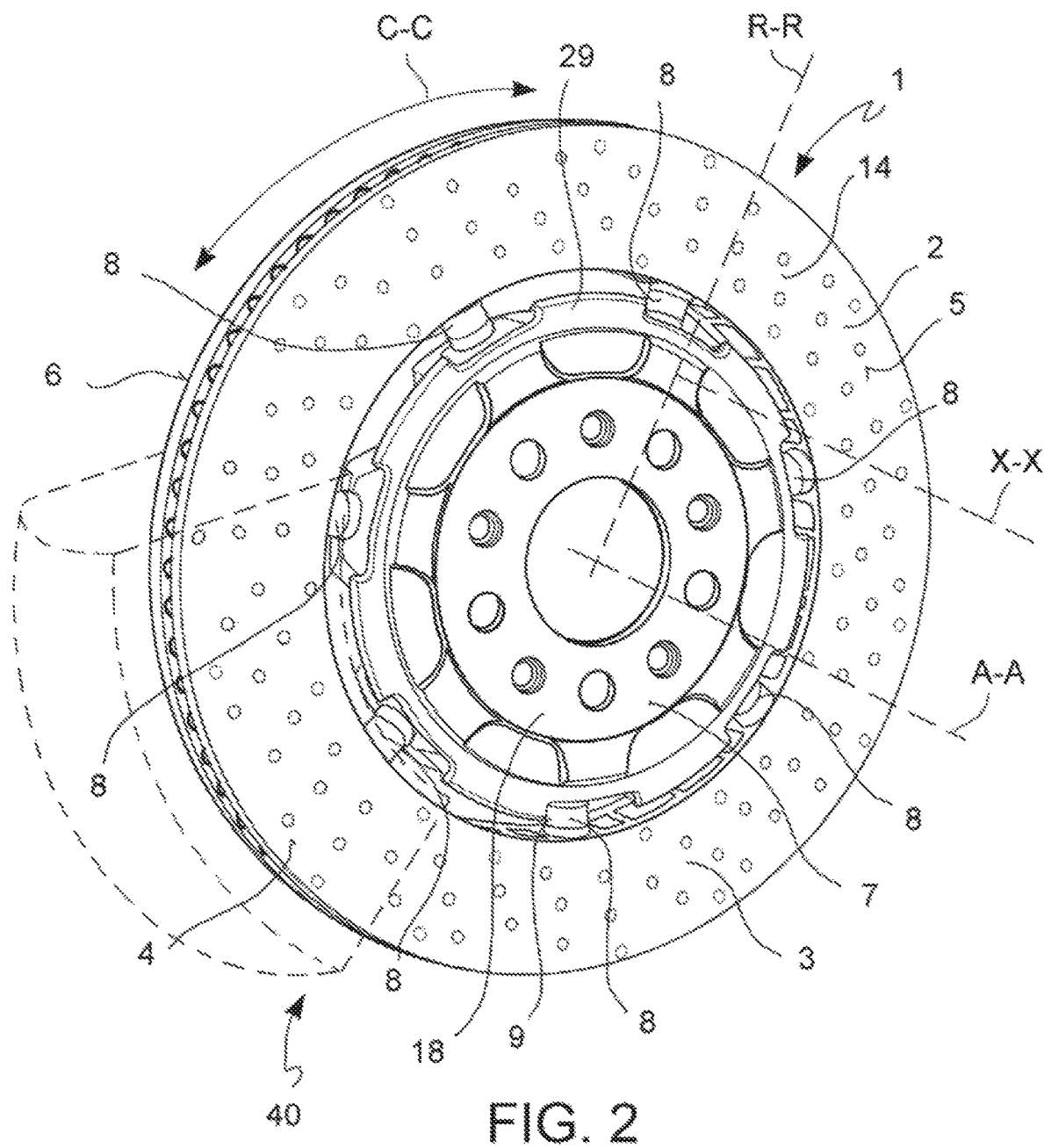
FIG. 2 shows an axonometric view of the device in FIG. 1.
Figure 3:
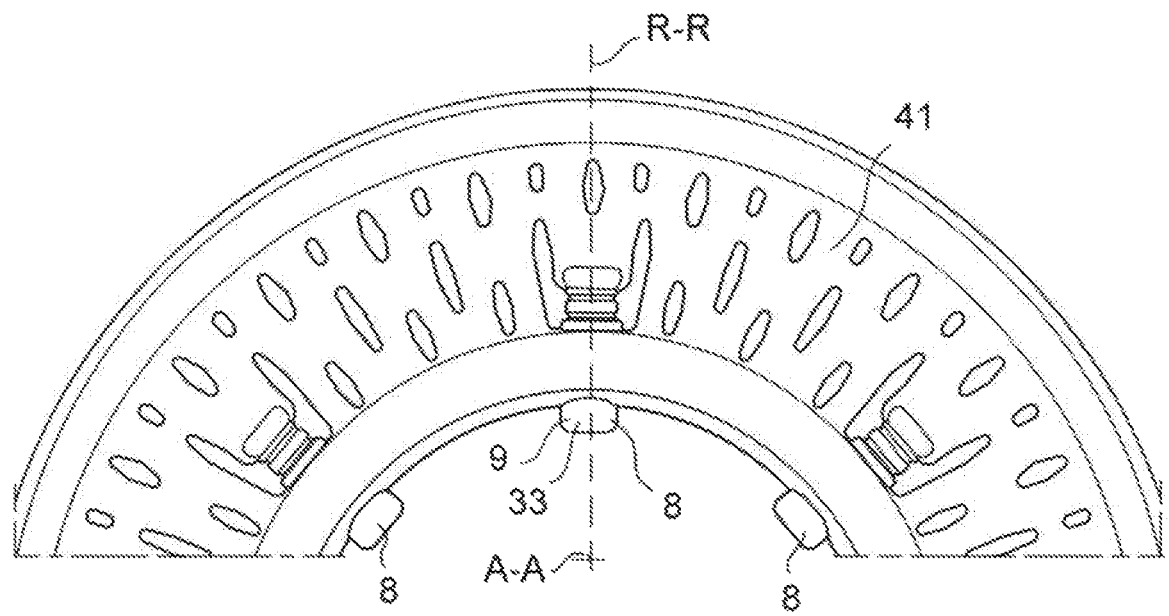
FIG. 3 depicts a partially cross-sectioned front view of a core for melting a braking band, in which there are noted connecting elements that remain co-melted in the connection portion or bell.
Figure 4:
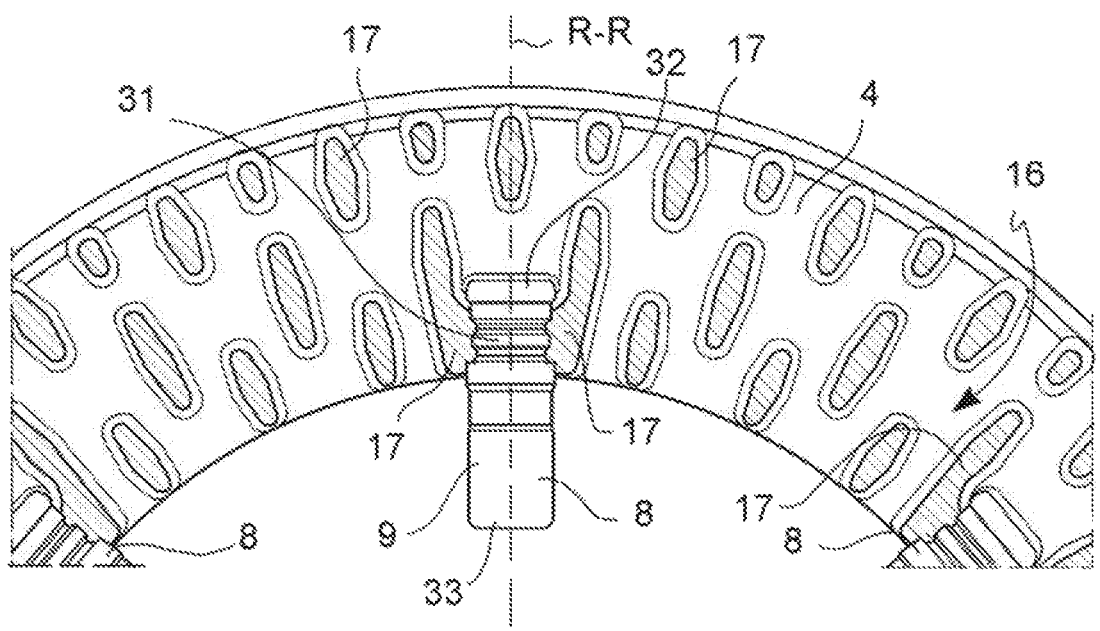
FIG. 4 shows a portion of a section of the device in FIG. 1, a section made according to a plane transverse to the axial direction X-X in which there is noted the ventilation duct and the connecting pegs or fins of the boards.
Figure 5:
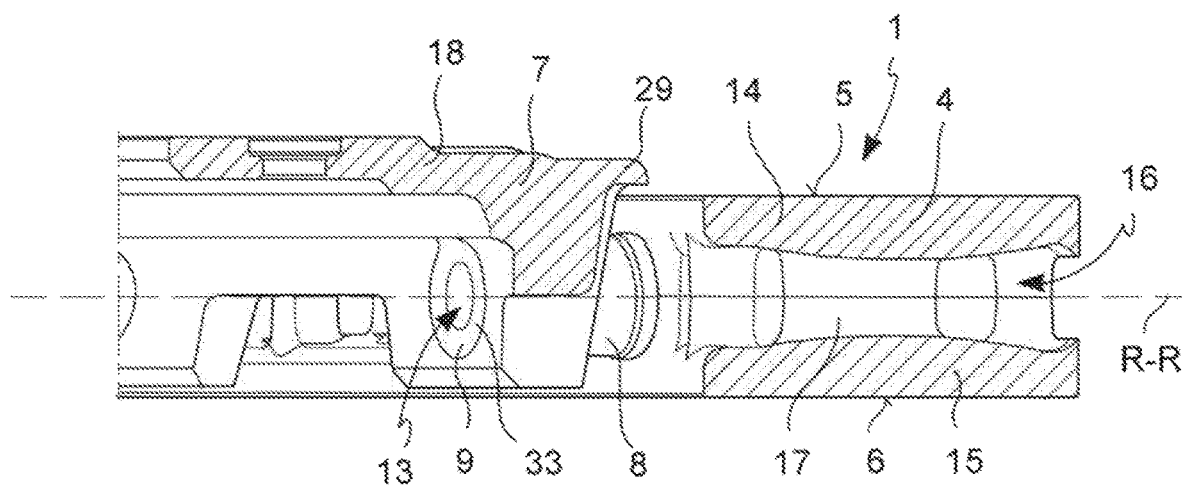
FIG. 5 depicts a portion of a section of the device in FIG. 1 according to a plane passing through the rotation axis A-A and a radial direction R-R.
Figure 6:
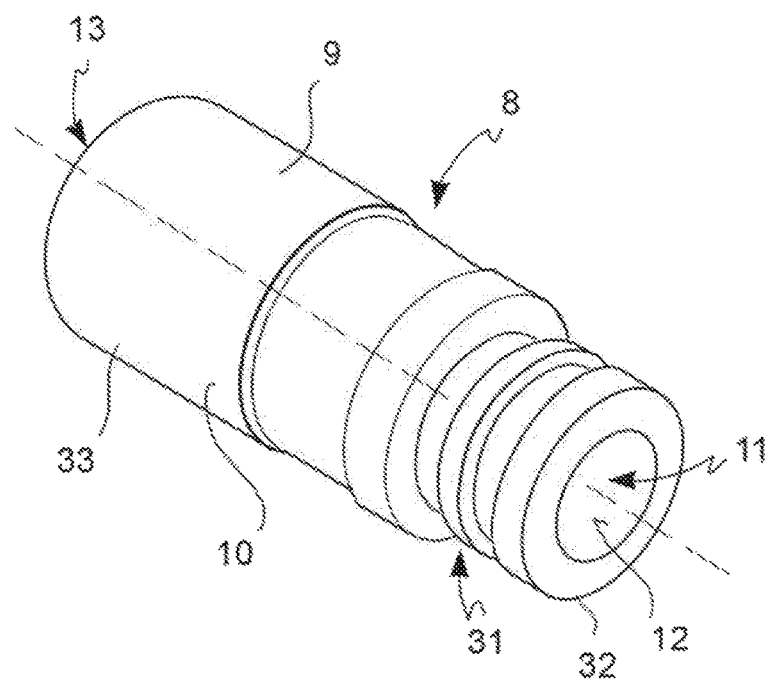
FIG. 6 shows an axonometric view of a connection device of the braking band to the connection portion or bell.
Figure 7:
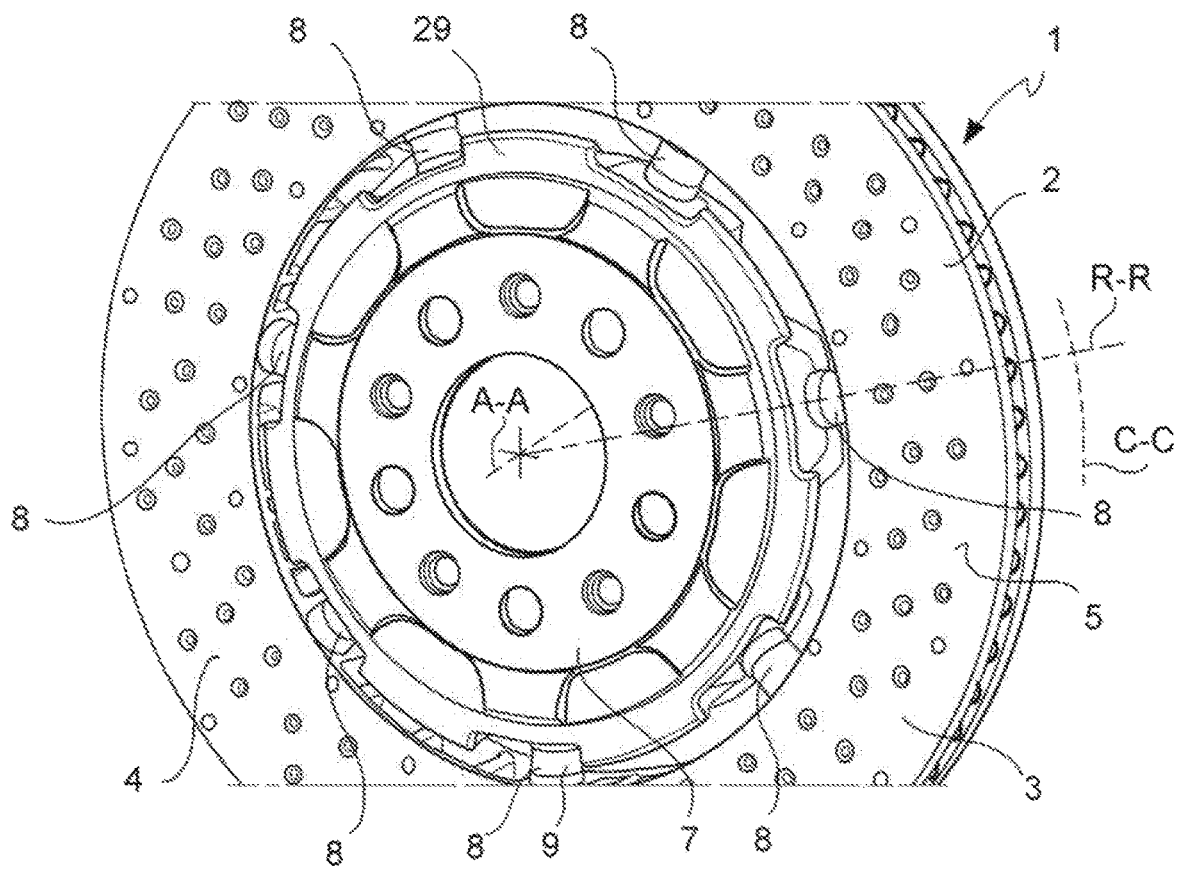
FIG. 7 depicts an enlarged portion and axonometric view of a braking device according to one embodiment.
Figure 8:
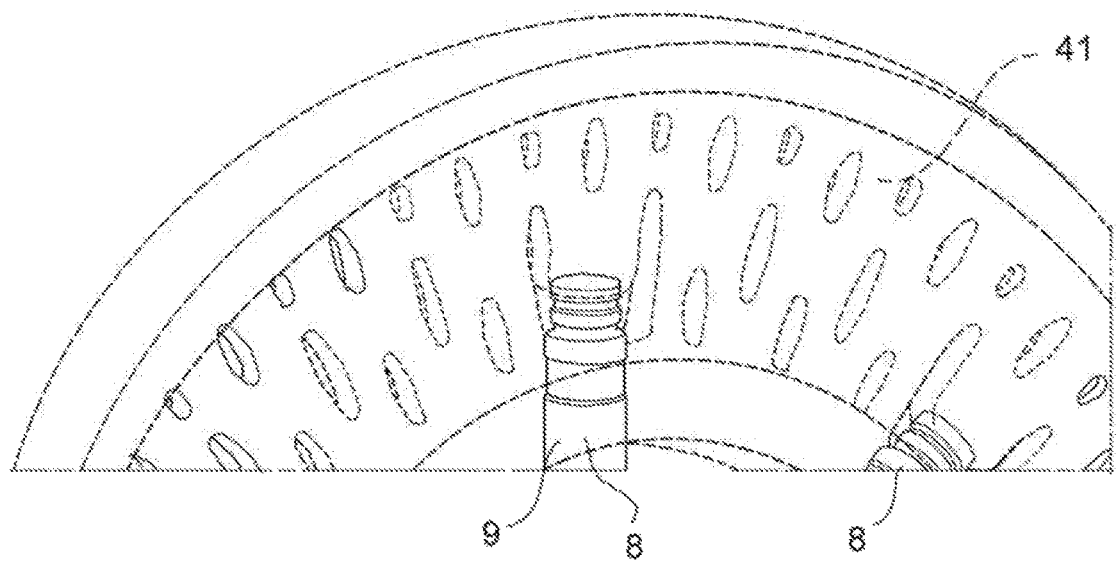
FIG. 8 depicts an enlarged detail of a connecting element in the end thereof firmly connected to a braking band.
Figure 9:
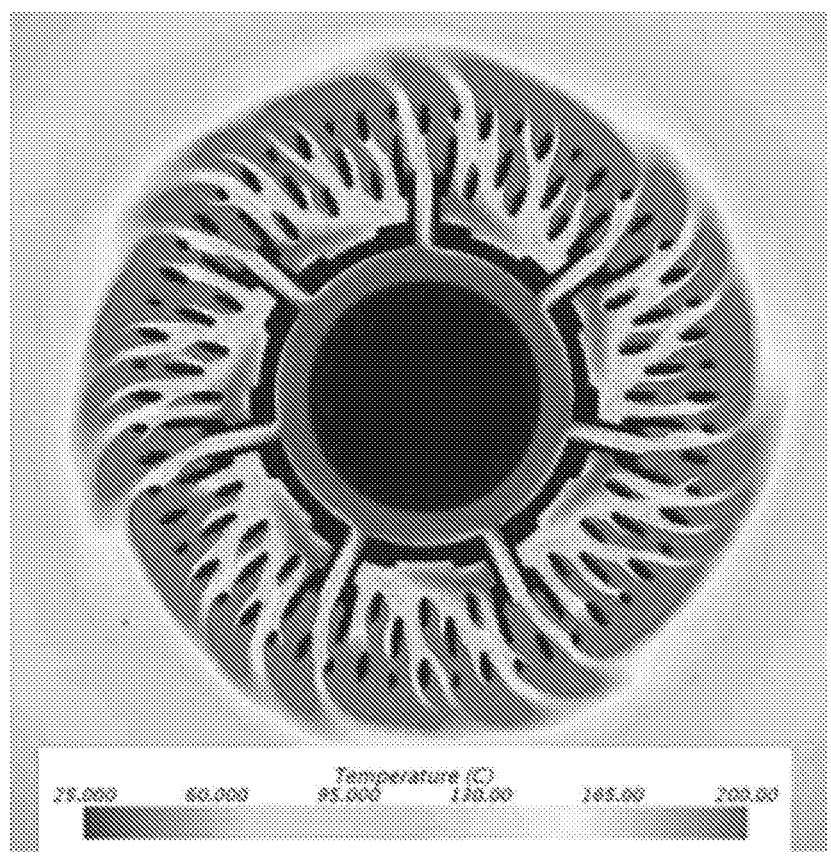
FIG. 9 shows the results of a simulation of evacuating the cooling air from a device according to the invention, in which there are depicted the velocity vectors of the air flow and, in grey, the temperature of the air.
Figure 10:
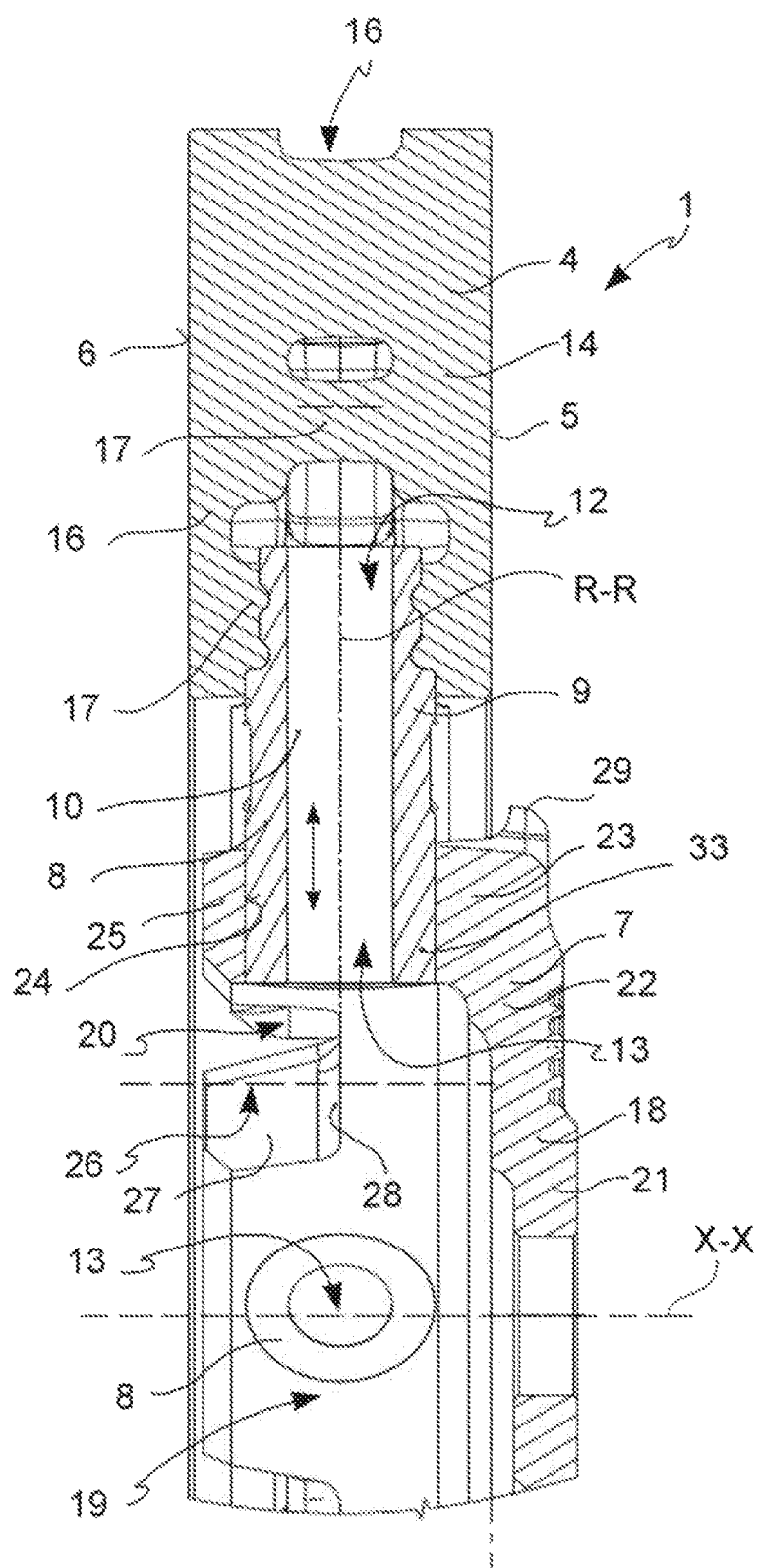
FIG. 10 shows a portion of a section on a plane along the rotation axis A-A and a radial direction R-R, in particular along the axis of a connecting element, of a device according to the invention.
Figure 11:
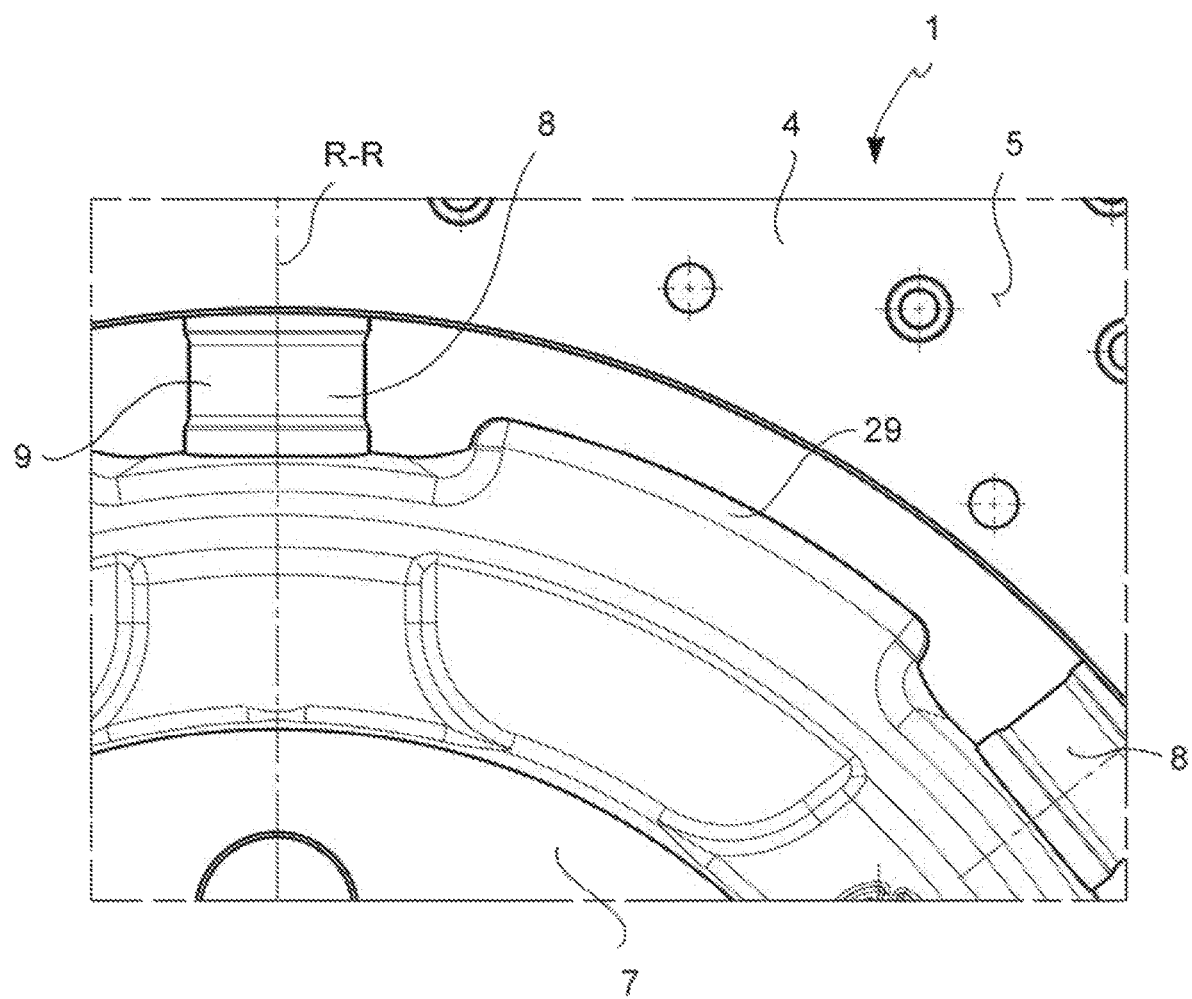
FIG. 11 depicts an enlargement of a portion of the braking device in the connection area between the braking band and the bell.

According to a general embodiment, there is provided a braking device 1.

This braking device 1 for a vehicle comprises a brake disc 2 of a disc brake 40, suitable for rotating about a rotation axis A-A, in which said disc 2 comprises a disc body 3 and in which said disc body 3 comprises a braking band 4 having opposite braking surfaces 5, 6.

Said disc body 3 comprises at least one connection portion 7, or bell, suitable for connecting disc 2 to a connection device 8 of a vehicle associable with the braking device 1.

Said braking band 4 defines an axial direction X-X parallel to the rotation axis A-A of disc 2, a radial direction R-R orthogonal to the axial direction X-X and a tangential or circumferential direction C-C orthogonal both to the axial direction X-X and to the radial direction R-R.

Said connection portion 7 is connected to said braking band 4 by means of connecting elements 8.

Said connecting elements are a plurality of connecting elements which are equally spaced apart in circumferential direction C-C.

Said plurality of connecting elements 8 are a predefined number and said number is a prime number.

Advantageously, there are seven of said connecting elements 8.

Tests show that the prime number seven allows the problem of the circumferential vibratory waves on the braking band to be minimized and the driving comfort of the vehicle on which the braking device is installed to be optimized, thus in particular minimizing the squeaking caused by the braking action.

Surprisingly, these results are not obtained using 5 as the number of connecting elements, which makes the device too yielding and therefore capable of amplifying the vibrations, nor using 11, which makes the braking device too rigid and therefore even louder.

According to one embodiment, said braking band 4, said connection portion or bell 7 and said connecting elements 8 are different components from one another, connected to one another to form said brake disc 2.

According to one embodiment, said braking band 4 and said connection portion or bell 7 are made of a first material and said connecting elements 8 are made of a second material.

According to one embodiment, said braking band 4 is made of a first material, said connecting elements 8 are made of a second material and said connection portion or bell 7 is made of a third material.

According to one embodiment, said braking band 4 is made of cast iron, said connecting elements 8 are made of steel and said connection portion or bell 7 is made of aluminum.

According to one embodiment, said connecting elements 8 are dragging pins 9.

According to one embodiment, said dragging pins 9 each have a hollow pin body 10 forming at least a through opening 11 which leads external to said hollow pin body 10 by means of at least two opposite windows 12, 13.

According to one embodiment, said braking band 4 has two opposed band boards 14, 15 separated by a band ventilation duct 16. Said opposed band boards 14, 15 are connected to each other by pegs or fins 17.

According to one embodiment, said connection portion 7 has a bell-shaped connection portion body 18 which embraces a bell inner cavity 19 partly suitable for associating the braking device 1 with a vehicle and partly for creating a cooling air inflow bell gap 20.

According to one embodiment, said opposite windows 12, 13 of each of said dragging pins 9 lead into a first window 12 in said band ventilation duct 16 and a second window 13 in said bell gap 20.

According to one embodiment, said connecting elements 8 are firmly connected to said braking band 4 so as to avoid a related movement between said connecting elements 8 and said braking band 4 during the operation of said braking device 1 mounted on a vehicle.

According to one embodiment, said connection portion 7 is bell-shaped and comprises a disc-shaped attachment flange 21 having a flange outer edge 22 and a cylindrical connecting casing 23 which protrudes in axial direction X-X from the flange outer edge 22.

According to one embodiment, said cylindrical connecting casing 23 comprises through seats 24 which freely slidingly house said connecting elements 8, thus allowing the braking band to expand radially R-R when thermally urged, thus moving radially (along radial directions R-R) away from said bell 7.

According to one embodiment, said dragging pin 9 comprises ribs for a firm anchoring thereof to the braking band 4.

According to one embodiment, said ribs are circumferential ribs alternated with circumferential seats.

According to one embodiment, said connection portion 7 is bell-shaped and comprises a disc-shaped attachment flange 21 having a flange outer edge 22 and a cylindrical connecting casing 23 which protrudes in axial direction X-X from the flange outer edge 22. Said cylindrical connecting casing 23 comprises axially overhanging extensions 25 protruding in axial direction X-X and alternated in circumferential direction C-C with bell through windows 26.

According to one embodiment, said axially overhanging extensions 25 comprise through seats 24 which freely slidingly house said connecting elements 8.

According to one embodiment, said bell through windows 26 each comprise a window edge 27 having a base portion 28 which extends in circumferential direction C-C.

According to one embodiment, there is, close to said base portion 28, at least one flow-diverter fin 29 which protrudes in radial direction R-R towards the braking band 4.

According to one embodiment, said flow-diverter fin 29 joins to said axially overhanging extensions 25 with axial ribs 30.

According to one embodiment, said braking band 4 has two opposed band boards 14, 15 separated by a band ventilation duct 16. Said opposed band boards 14, 15 are connected to each other by pegs or fins 17. Each connecting element 8 comprises a hollow pin body 10 with a band pin end 31. Said band pin end 31 is embraced by a pair of pegs or fins 17 which fix said hollow pin body 10 to the braking band 4.

According to one embodiment, said pair of pegs or fins 17 which fix said hollow pin body 10 to the braking band 4 move away from said band pin end 31, moving away from each other and leaving free a window 12 with which a through opening 11 of said hollow pin body 10 leads external to said hollow pin body 10.

According to one embodiment, said band pin end 31 comprises a pin terminal portion 32 which protrudes into said band ventilation duct 16 free from pegs or fins 17.

The present invention also relates to a disc brake 40 comprising at least one braking device 1 according to any one of the embodiments described above.

The present invention also relates to a vehicle comprising at least one braking device 1 according to any one of the embodiments above, and at least one connection device 8 which is integral with a vehicle wheel and which restrains a disc 2 of a disc brake 40 to said vehicle wheel.

In addition to reducing the braking squeaking, the ventilation efficiency is optimized due to the proposed solutions of the device.

Figure 12:
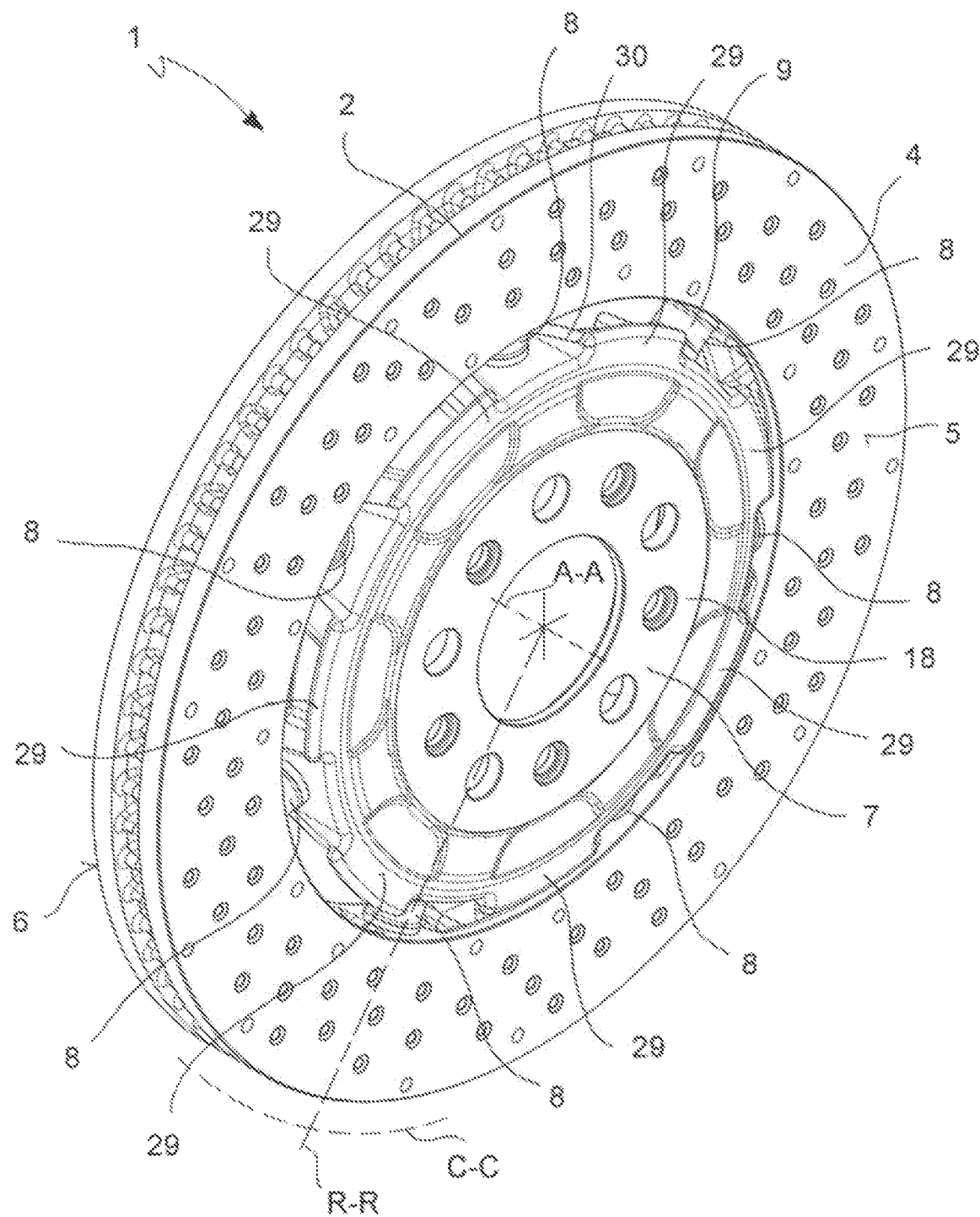
FIG. 12 shows an axonometric view of a braking device.
Figure 13:
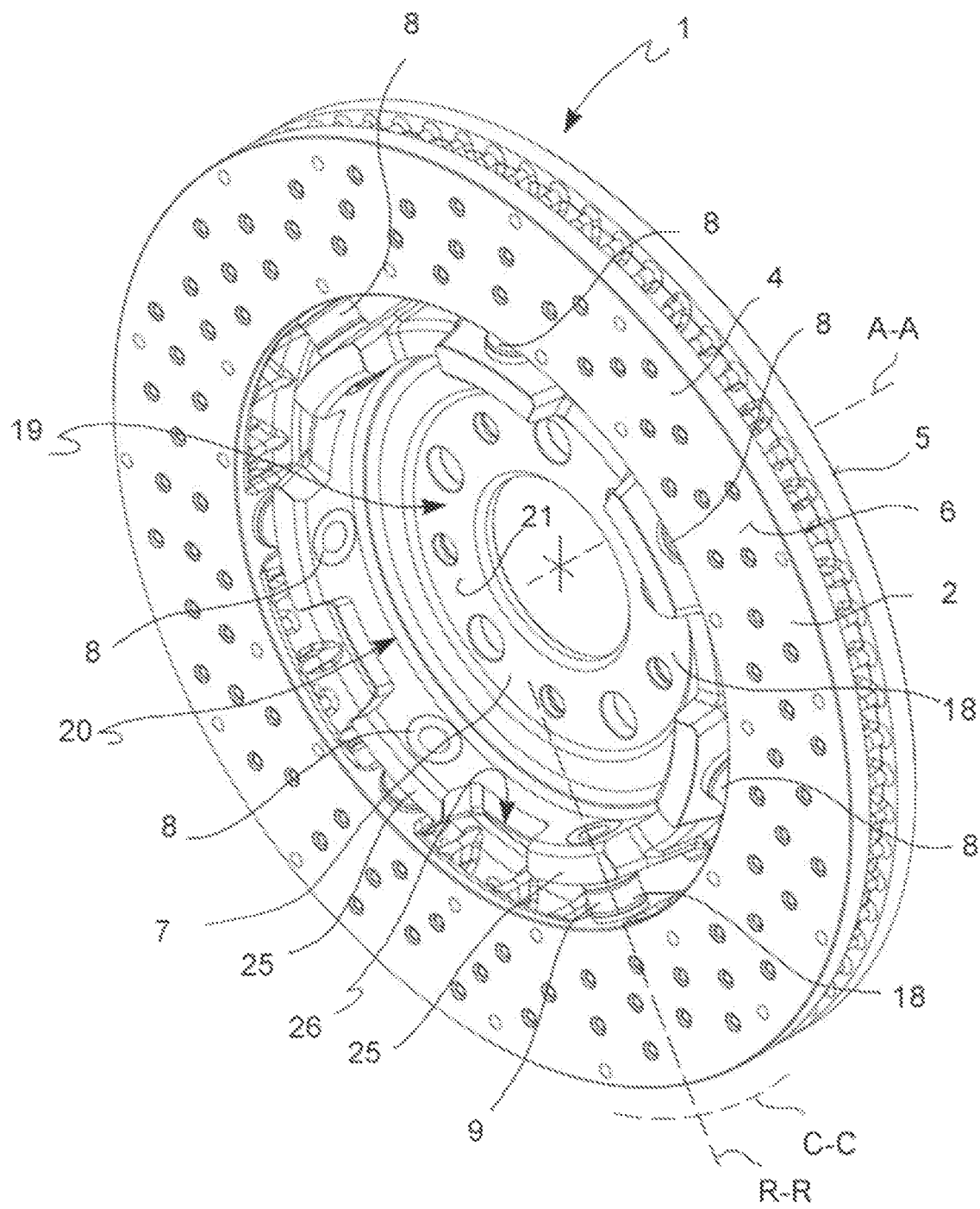
FIG. 13 depicts an axonometric view of the device in FIG. 12, but from the opposite side with respect to the one depicted in FIG. 12.

Computational fluid dynamic analyses were performed on the core and dragging pins showing an optimal air flow and removal of the heat from the device, thus ensuring optimal thermodynamic performance (FIG. 12).

Moreover, the ventilation efficiency is increased due to the use of cable dragging. The simulations show the passage of air through the dragging.

An improved ventilation efficiency is obtained also due to the fins.

Said fins divert the flow over the bell, thus allowing the air flow to be diverted and the ventilation to be channeled towards the band where the temperatures are critical.

A person skilled in the art may make many changes, adaptations and replacements to the embodiments described above or can replace elements with others which are functionally equivalent in order to satisfy contingent needs without however departing from the scope of protection of the appended claims.

LIST OF REFERENCES

1 Braking device
2 brake disc
3 disc body
4 braking band
5 opposite braking surfaces
6 opposite braking surfaces
7 connection portion or bell
8 connecting elements
9 dragging pins
10 hollow pin body
11 through opening
12 opposite windows
13 opposite windows
14 band boards
15 band boards
16 band ventilation duct
17 pegs or fins
18 connection portion body
19 bell inner cavity
20 bell gap
21 disc-shaped attachment flange
22 flange outer edge
23 cylindrical connecting casing
24 through seats for pins
25 axially overhanging extensions
26 bell through windows
27 window edge
28 base portion
29 flow-diverter fin
30 axial ribs
31 band pin end
32 pin terminal portion
33 pin bell end
40 disc brake
41 core for braking band
A-A rotation axis
X-X axial direction
R-R radial direction
C-C tangential or circumferential direction

The invention claimed is:

1. A braking device for a vehicle, comprising a brake disc of a disc brake, suitable for rotating about a rotation axis (A-A), wherein said brake disc comprises a disc body; wherein said disc body comprises a braking band having opposite braking surfaces; wherein said disc body comprises at least one connection portion, or bell, suitable for connecting the brake disc to a connection device, or journal, of a vehicle associable with the braking device;
   wherein said braking band defines an axial direction (X-X) parallel to the rotation axis (A-A) of the brake disc, a radial direction (R-R) orthogonal to the axial direction (X-X) and a tangential or circumferential direction (C-C) orthogonal both to the axial direction (X-X) and to the radial direction (R-R);
   wherein said connection portion is connected to said braking band by connecting elements,
   said connecting elements being a plurality of elements equally spaced apart in circumferential direction (C-C);
   said connecting elements being a predefined number which is a prime number,
   and wherein there are seven of said connecting elements;
   said connecting elements are firmly connected to said braking band so as to avoid a related movement between said connecting elements and said braking band during operation of said braking device mounted on the vehicle;
   said connection portion is bell-shaped and comprises a disc-shaped attachment flange having a flange outer edge and a cylindrical connecting casing which protrudes in axial direction (X-X) from the flange outer edge; and
   said cylindrical connecting casing comprises through seats which freely slidingly house said connecting elements thus allowing the braking band to expand radially (R-R) when thermally urged.

2. The braking device of claim 1, wherein
   said braking band has two opposed band boards separated by a band ventilation duct;
   said opposed band boards are connected to each other by pegs or fins;
   each connecting element comprises a hollow pin body with a band pin end; and
   said band pin end is embraced by a pair of pegs or fins which fix said hollow pin body to the braking band.

3. The braking device of claim 2, wherein said pair of pegs or fins fixing said hollow pin body to the braking band develop from said band pin end, away from each other, thus leaving free a window with which a through opening of said hollow pin body leads external to said hollow pin body.

4. The braking device of claim 2, wherein said band pin end comprises a pin terminal portion which protrudes into said band ventilation duct free from pegs or fins.

5. The braking device of claim 1, wherein
said connection portion is bell-shaped and comprises a disc-shaped attachment flange having a flange outer edge and a cylindrical connecting casing which protrudes in axial direction (X-X) from the flange outer edge;
said cylindrical connecting casing comprises axially cantilevered extensions protruding in axial direction (X-X) and alternated in circumferential direction (C-C) with bell through windows; and
said axially cantilevered extensions comprise through seats which freely slidingly house said connecting elements.

6. The braking device of claim 5, wherein
each of said bell through windows comprises a window edge having a base portion which extends in circumferential direction (C-C);
at least one flow-diverter fin protruding in radial direction (R-R) towards the braking band is provided close to said base portion; and
said at least one flow-diverter fin joins said axially overhanging extensions with axial ribs.

7. The braking device of claim 1, wherein said braking band, said connection portion or bell and said connecting elements are components different from one another and connected to one another to form said brake disc.

8. The braking device of claim 1, wherein
said connecting elements are dragging pins;
each of said dragging pins has a hollow pin body forming at least a through opening which leads external to said hollow pin body by at least two opposite windows;
said braking band has two opposed band boards separated by a band ventilation duct;
said opposed band boards being connected to each other by pegs or fins; and
said connection portion has a bell-shaped connection portion body which embraces a bell inner cavity partly suitable for associating the braking device with the vehicle and partly for creating a cooling air inflow bell gap;
said opposite windows of each of said dragging pins leading into a first window in said band ventilation duct and a second window in said bell gap.

9. A disc brake comprising at least one braking device according to claim 1.

10. The braking device of claim 1, wherein said braking band and said connection portion or bell are made of a first material and said connecting elements are made of a second material.

11. The braking device of claim 1, wherein said braking band is made of a first material, said connecting elements are made of a second material and said connection portion or bell is made of a third material.

12. The braking device of claim 1, wherein said braking band is made of cast iron, said connecting elements are made of steel and said connection portion or bell is made of aluminum.

13. The braking device of claim 1, wherein said connecting elements have a band pin end fixed within said braking band via a plurality of circumferential grooves on an outer surface of said band pin end; and
wherein said connecting elements have a pin bell end with a substantially smooth outer diameter adapted to facilitate relative movement between said connecting elements and said braking band with said connection portion.

* * * * *